Dec. 20, 1966 W. H. LEGAT ETAL 3,293,584

STRAIN TRANSDUCER TRANSISTOR

Filed Aug. 10, 1964

INVENTORS
WILHELM H. LEGAT
LEWIS K. RUSSELL
ALAN F. DIXON

BY

AGENT

United States Patent Office 3,293,584

Patented Dec. 20, 1966

3,293,584

STRAIN TRANSDUCER TRANSISTOR

Wilhelm H. Legat, Woodside, Lewis K. Russell, Livermore, and Alan F. Dixon, Palo Alto, Calif., assignors to Raytheon Company, Lexington, Mass., a corporation of Delaware Filed Aug. 10, 1964, Ser. No. 388,523
6 Claims. (Cl. 338—2)

The present invention relates to semiconductor signal translating devices and, more particularly, to semiconductor strain transducers.

This invention sets forth a semiconductor signal translating device of a new and improved form and is predicated upon the discovery that nonuniform, concentrated, anisotropic stress on junctions can be detected and interpreted in terms of the current, voltage or reactance characteristics of such junctions. These types of signal translating devices are described in copending applications, Serial No. 261,065, filed February 26, 1963, and Serial No. 268,772, filed March 28, 1963. Both of these applications have been assigned to the assignee of the instant application.

The term "junction" as used herein in respect to the present invention is defined as a region of transition between semi-conducting regions of different electrical properties—which definition was established by IRE standards in the October 1954 issue of the "Proceedings of the IRE."

In general, this invention comprises a body of semiconductor crystalline material having at least two junctions therein, said material having a notch or groove adjacent at least one of said junctions. In one illustrative embodiment of this invention there is provided a strain sensitive transistor which simultaneously utilizes current changes in a forward biased emitter-base junction and a reverse biased base-collector junction to obtain amplification.

It is therefore an important object of the present invention to provide novel amplification means.

A further object of the invention is to provide means for producing dislocation loops in a region of at least one junction within a transducer transistor.

Figure 1:
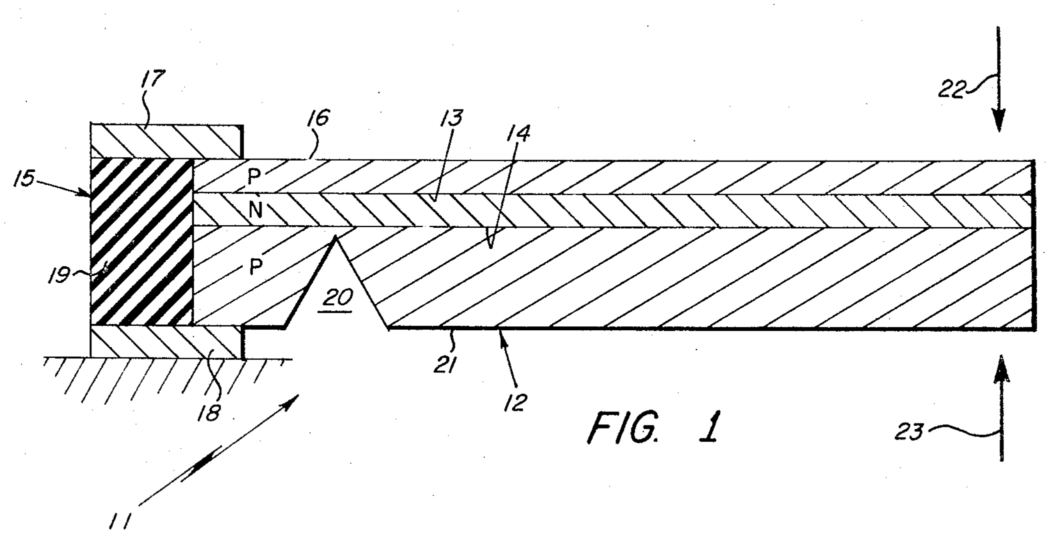
Figure 2:
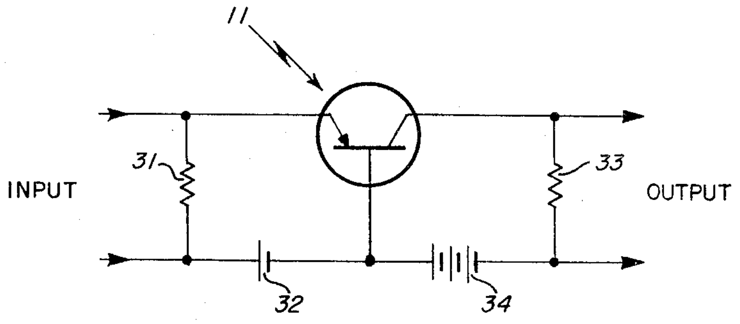
Figure 3:
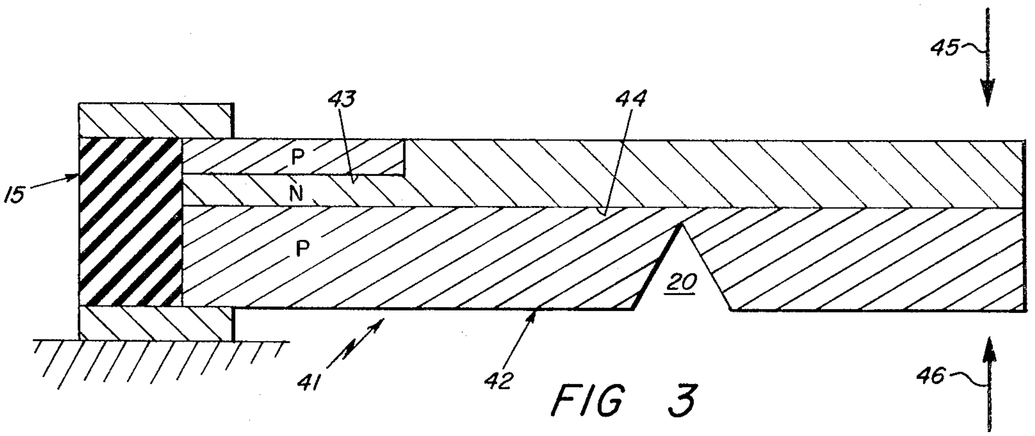

Other objects and advantages of the present invention will become apparent by consideration of the following description, taken in conjunction with the accompanying drawing, in which:

FIG. 1 shows a longitudinal sectional view of a strain transducer transistor according to this invention;

FIG. 2 schematically illustrates a doubly biased configuration of the device depicted in FIG. 1; and FIG. 3 shows an alternative embodiment of a strain transducer transistor according to this invention.

In a previous device utilizing the anisotropic strain effect, a semiconductor body having a PN junction therein is disposed so that a stressing mechanism, such as a stylus, is applied to the body in such a manner that anisotropic stress is applied to a localized region of the junction, whereby changes in junction characteristics occur. These changes have been employed to, alternatively, rectify current flowing through said material or vary the net resistance of the material. These devices are more fully set forth in the previously mentioned copending application, Serial No. 261,065.

Later embodiments of these devices achieved the desired stress concentration by notching the semiconductor element adjacent the PN junction as set forth in the aforementioned, copending application, Serial No. 268,722.

There is shown in FIG. 1 a cantilever type strain transducer transistor 11 comprising a body 12 of semiconductor material having junctions 13 and 14 therein, and held in a cantilevered position by a suitable support device 15. Semiconductor body 12, for example, could consist of silicon, germanium, gallium arsenide, or other materials such as the so-called group III–V or II–VI compounds. And, as more fully set forth in the previously mentioned copending applications, it is preferred that junction 13 lie within a depth of 0.010 inch of a surface 16 of semiconductor body 12. Junctions 13 and 14 may be formed in body 12 by any of the known techniques commonly employed in the manufacture of transistors.

The semiconductor transistor may be initially made by a variety of means, such as the method set forth in United States Patent No. 3,025,589 which issued to J. A. Hoerni on March 20, 1962, entitled "Method of Manufacturing Semiconductor Devices." For example, one satisfactory device may be formed by first diffusing an N-type impurity into a P-type silicon wafer. With a P-type silicon wafer, the impurity would be one of the known donor impurities, preferably alloyed with silicon. Application of sufficient heat to raise the wafer to an appropriate temperature results in a diffusion of the impurity into the wafer so as to produce a region or portion of N-type silicon within the wafer. A layer of P-type material can be likewise formed by diffusing an acceptor impurity into the N-type layer. Intermediate these layers of dissimilar conductivity materials, there is produced the previously defined junctions. As silicon technology is available in the literature, it is here only noted that N-type silicon may be formed by inclusion of an impurity chosen from group V of the periodic table while P-type silicon may be formed by inclusion of an impurity from group III.

Support device 15 may comprise a first electrode 17 in contact with surface 16 and maintained in a fixed relationship to a second electrode 18 by means of an insulator 19. The electrodes 17 and 18, together with insulator 19, provide a support means whereby body 12 is held in a cantilevered position and whereby surface 16 of the body is maintained in electrical communication with electrode 17 and the opposed surface 21 is maintained in electrical communication with electrode 18. Support device 15 is shown by way of illustration only as an electrode device; it is entirely within the scope of the present invention that the support means be composed of an electrically insulating material while electrical contact is provided by some other means.

Strain transducer transistor 11 further comprises a notch or groove 20 cut into surface 21 of body 12, preferably close to electrode device 15. Notch 20 is preferably cut into body 12 to a depth close to but not touching junction 14. Notch or groove 20 may be in the form of a kerf or a V-shape groove or any other suitable reduction in at least one dimension of body 12, such as perpendicular to the plane of surface 21, so that anisotropic stress will be applied to a small area of junctions 13 and 14. As indicated, it is preferable that notch 20 be made close to the clamped end of body 12 so that a force applied along the line shown by force arrows 22 or 23 will take advantage of the mechanical leverage and cause anisotropic stress to appear in junctions 13 and 14 at the apex of groove 20, thus producing a variation in the electrical characteristics of these junctions in proportion to the force applied.

FIG. 2 schematically illustrates the PNP transistor depicted in FIG. 1 in an appropriate biasing circuit. More specifically stated, appropriate drop-down resistor 31 and battery 32 are series connected across strain transducer transistor 11 to forward bias the emitter-base junction. Drop-down resistor 33 and battery 34 are appropriately series connected across strain transducer transistor 11 to reverse bias the base-collector junction. Thus, when the strain transducer transistor 11, shown in FIG. 1, is employed in the circuit shown in FIG. 2 and when force is applied along the directions indicated by force arrows 22 or 23, an amplification effect is achieved. The applied stress causes a change in current (increasing or decreasing) of both the emitter-base and the base-collector currents in the same direction. This multiplication phenomena provides a mechanically controllable amplification means.

The theory of operation of this invention, however, is not completely known. It is believed that the nonuniform, concentrated, anisotropic stress on the junctions produced by the coaction of notch 20 and the application of force along the directions indicated by force arrows 22 or 23 produces dislocation loops deep within the junctions, carrying generation-recombination centers with it. This, in turn, causes an increase or decrease in current.

FIG. 3 shows an alternate embodiment of a strain transducer transistor 41 comprising a body 42 of semiconductor material having junctions 43 and 44 therein, and held in a cantilevered position by an electrode device 15 similar to that shown in FIG. 1. The difference between strain transducer transistor 41, shown in FIG. 3, and strain transducer transistor 11, shown in FIG. 1, is that notch 20 is adjacent only the single junction 44 in transistor 41 (and is remote from the other junction), whereas notch 20 is adjacent both junctions in transistor 11. For this reason, when force is applied along either direction indicated by force arrows 45 or 46, the concentrated, nonuniform, anisotropic stress produced by the co-action of this force with notch 20 affects the characteristics of only junction 44. This provides a higher response for junction 44 without affecting the properties of junction 43.

It should be noted that many changes in the structures shown in the drawing and described in the specification may be made within the scope of the present invention. For example, while the above description of the transistor structure has been referenced to a PNP transistor, it will be appreciated that it is equally applicable to an NPN type transistor. Further, while cantilevered embodiments are shown, other configurations are possible. Accordingly, it is to be understood that the form of the present invention is to be taken as a preferred example of the same and that various changes in the shape, size, material, constitution, and arrangement of parts may be resorted to without departing from the spirit of said invention or the scope of the subjoined claims.

What is claimed is:

1. A strain transducer transistor comprising:

(a) an axially extending semiconductor body having a first substrate layer of selected conductivity type, a second layer of opposite conductivity type overlying one side of the first layer, and a third layer of opposite conductivity type overlying the opposite side of the first layer, said second and third layers having respective parallel first and second planar surfaces, and parallel first and second P-N junctions therein between said first layer and the respective second and third layers and extending in planes parallel with said first and second surfaces respectively, (b) said second surface of said semiconductor body having a groove extending transversely thereacross and into said third layer and terminating short of said second junction and oriented perpendicular to the axis of said semiconductor body, and (c) support means engaged with the respective second and third layers of the semiconductor body to maintain said body in an axially extending, cantilevered position, and first, second and third electrode means connected to the respective layers for electrically connecting said layers to an external circuit.

2. The strain transducer transistor of claim 1 wherein said transistor is an NPN transistor.

3. The strain transducer transistor of claim 1 wherein said transistor is a PNP transistor.

4. A strain transducer transistor as set forth in claim 1 wherein said first and second junctions extend in parallel planes throughout the length of the semiconductor body, said junctions both lying sufficiently close to said groove whereby small areas thereof are stressed by bending movement of the body about the apex of the groove.

5. A strain transducer transistor as set forth in claim 1 wherein said second junction extends in a plane throughout the length of the semiconductor body, said first junction extends from the supported end of the body only a predetermined distance toward the opposite end of the body which distance is shorter than the length of said first junction, and said groove is positioned in a vertical plane located between the unsupported end of the body and the adjacent end of the first junction whereby a small area of only said second junction is stressed by bending movement of the body about the apex of the groove.

6. A strain transducer transistor as set forth in claim 1 wherein said support means includes said first and third electrode means and comprises an insulated block at the supported end of the semiconductor body, said first and third electrode means comprising metal plates affixed to surfaces of the respective second and third layers and having projecting portions overlying and affixed to said insulated block.

References Cited by the Examiner

UNITED STATES PATENTS

| | | | |
|---|---|---|---|
| 2,898,477 | 8/1959 | Hoesterey. | |
| 2,929,885 | 3/1960 | Mueller. | |
| 2,662,957 | 12/1953 | Eisler. | |
| 2,939,317 | 6/1960 | Mason | 338—2 X |
| 3,049,685 | 8/1962 | Wright | 338—2 |
| 3,132,408 | 5/1964 | Pell | 338—2 X |
| 3,160,844 | 12/1964 | McLellan | 338—4 |
| 3,199,340 | 8/1965 | Hartenstein et al. | 73—88.5 |

References Cited by the Applicant

UNITED STATES PATENTS

| | | |
|---|---|---|
| 2,632,062 | 3/1953 | Montgomery. |
| 2,662,957 | 12/1953 | Sisler. |
| 2,866,014 | 12/1958 | Burns. |
| 3,049,685 | 8/1962 | Wright. |
| 3,084,300 | 4/1963 | Sanchez. |
| 3,089,108 | 5/1963 | Gong et al. |

RICHARD M. WOOD, *Primary Examiner.*

W. D. BROOKS, *Assistant Examiner.*